United States Patent [19]

Reiger, Jr.

[11] Patent Number: 4,974,313

[45] Date of Patent: Dec. 4, 1990

[54] LEAD GUIDE ACTUATOR MECHANISM FOR USE ON ARMATURE WINDING MACHINES

[75] Inventor: Arthur C. Reiger, Jr., Huber Heights, Ohio

[73] Assignee: Odawara Automation, Inc., Tipp City, Ohio

[21] Appl. No.: 410,769

[22] Filed: Sep. 21, 1989

[51] Int. Cl.$^5$ ............................................. H05K 15/09
[52] U.S. Cl. ....................................... 29/736; 29/597; 29/598; 140/92.1; 242/7.05 R; 242/7.05 B
[58] Field of Search ................. 29/597, 598, 733, 735, 29/736; 242/7.05 R, 7.05 A, 7.05 B, 7.05 C; 140/92.1

[56] References Cited

U.S. PATENT DOCUMENTS 3,713,598 1/1973 Bucholtz et al. ................. 29/597 X
4,289,281 9/1981 George et al. .................... 29/597 X Primary Examiner—Carl E. Hall
Attorney, Agent, or Firm—Biebel, French & Nauman

[57] ABSTRACT

A lead guide actuating mechanism for use on armature winding machines is mounted on the same non-rotating structure that supports the wire guide forms at the end of the flyer drive shaft. An axially movable piston surrounds the flyer motor drive shaft. The piston, when actuated, contacts rollers mounted on a diametrical arranged arm mounted for rotation with the flyer drive shaft. There is no contact between the piston and the rollers until the piston is actuated. The lead guide is attached to an extension of an axially aligned pin that has a bearing surface on its end which engages the arm; it is also moved axially when the piston is actuated, and thus the lead guide is moved into position in response to the action of the piston. The lead guide and the wire guide forms are mounted on a common non-rotating structure that can be quickly removed from the flyer drive shaft.

6 Claims, 5 Drawing Sheets

LEAD GUIDE ACTUATOR MECHANISM FOR USE ON ARMATURE WINDING MACHINES

BACKGROUND OF THE INVENTION

This invention relates to an improved lead guide actuating mechanism for use on armature winding machines.

Prior art lead guide mechanisms have used various methods of moving a lead guide into place relative to a commutator tang, however, all prior art devices tend to interfere with the operation of the winder in some way, such as in replacing the winding forms.

In one prior art device, the lead guide mechanism is mounted independently of the flyer mechanism and is actuated by a hydraulic cylinder. In other devices, the lead guides are spring loaded devices attached to the armature winding forms.

In another system, the lead guides operate through the use of slide systems within the armature winding form and are actuated by an air cylinder mounted in the winder bed, between the winding heads. In still another system, the lead guide operates though a yoke and roller system, which is air cylinder actuated, mounted to the flyer hub. In yet another system, the lead guide mechanism operates by use of a air cylinder operated shaft through the winding spindle.

Each of these prior art systems suffers from several disadvantages. Some tend to cause wire damage. Others use an operating mechanism in the winding form and on the bed, thus limiting access to the mechanism itself. Still others, such as the yoke-roller system, have wear problems or undue mechanical complexity.

SUMMARY OF THE INVENTION

The present invention overcomes all of the above problems by providing a relatively simple mechanical lead guide actuating mechanism that permits easy access to and removal of the lead guide form during tool change over operations.

Basically, the present invention employs an axially movable piston that surrounds the flyer motor drive shaft. The piston, when actuated, contacts rollers mounted on a diametrical arranged arm mounted for rotation with the flyer drive shaft. There is no contact between the piston and the rollers until the piston is actuated. When the piston is actuated, it engages the rollers and moves the arm axially. The lead guide is attached to an extension of an axially aligned pin that has a bearing surface on its end which engages the arm; it is also moved axially when the piston is actuated, and thus the lead guide is moved into position in response to the action of the piston. Springs return the arm and the pin to their normal, non-contacting position after the piston is retracted.

Because there is normally no contact between the piston and the rollers on the arm, and between the arm and the pin during winding, and contact is made only briefly at lead guide actuation, both wear of the components and power consumption are minimized.

Accordingly, it is an object of this invention to provide an improved lead guide actuating mechanism which is easily removable along with the wire guide forms.

It is another object of this invention to provide a lead guide actuating mechanism which includes an axially aligned pin for moving the lead guide in response to a piston which surrounds the flyer drive shaft.

It is still another object of this invention to provide a lead guide actuating mechanism where there is no contact between the rotating and non-rotating components when the lead guide is in the retracted position.

It is yet another object of this invention to provide a lead guide actuating mechanism for use on an armature winding machine of the type that includes a shaft for rotating a flyer which applies wire to slots in an armature, and a non-rotating component carried by the rotating shaft for supporting the wire guide forms which direct the wire into the slots, said mechanism including a lead guide, means for supporting said lead guide on the non-rotating component for movement from a first position clear of the tangs on the armature being wound to a second position whereby said lead guide covers a selected tang, and means for actuating said lead guide supporting means thereby to move the lead guide into position relative to the selected tang.

It is still a further object of this invention to provide a compact lead guide actuating mechanism for use in connection with an armature winding machine, said actuating mechanism comprising a rotating component and first and second non-rotating components; said first non-rotating component including an annular plenum surrounding the rotating member, a piston mounted in said plenum for axial movement relative to the rotating member, means for introducing gas under pressure into said one part of the plenum whereby to move said piston axially in a first direction, and said piston including an annular surface exposed for contact with said rotating component; said rotating component including a diametrically extending arm having roller means near the ends thereof for engaging said annular surface mounted for rotation with the flyer which applies wire to the armature; said second non-rotating component including a non-rotating shaft journaled within said sleeve onto which is mounted the wire guide forms, an axially aligned pin in said non-rotating shaft having a first end provided with a bearing surface for engaging said arm when said piston is moved axially in the first direction, said pin being provided with an arm extending radially outwardly through said non-rotating shaft for actuating the lead guide mechanism.

Other objects and advantages of the invention will be apparent from the following description, the accompanying drawings and the appended claims.

DESCRIPTION OF THE PREFERRED EMBODIMENT

Figure 1:
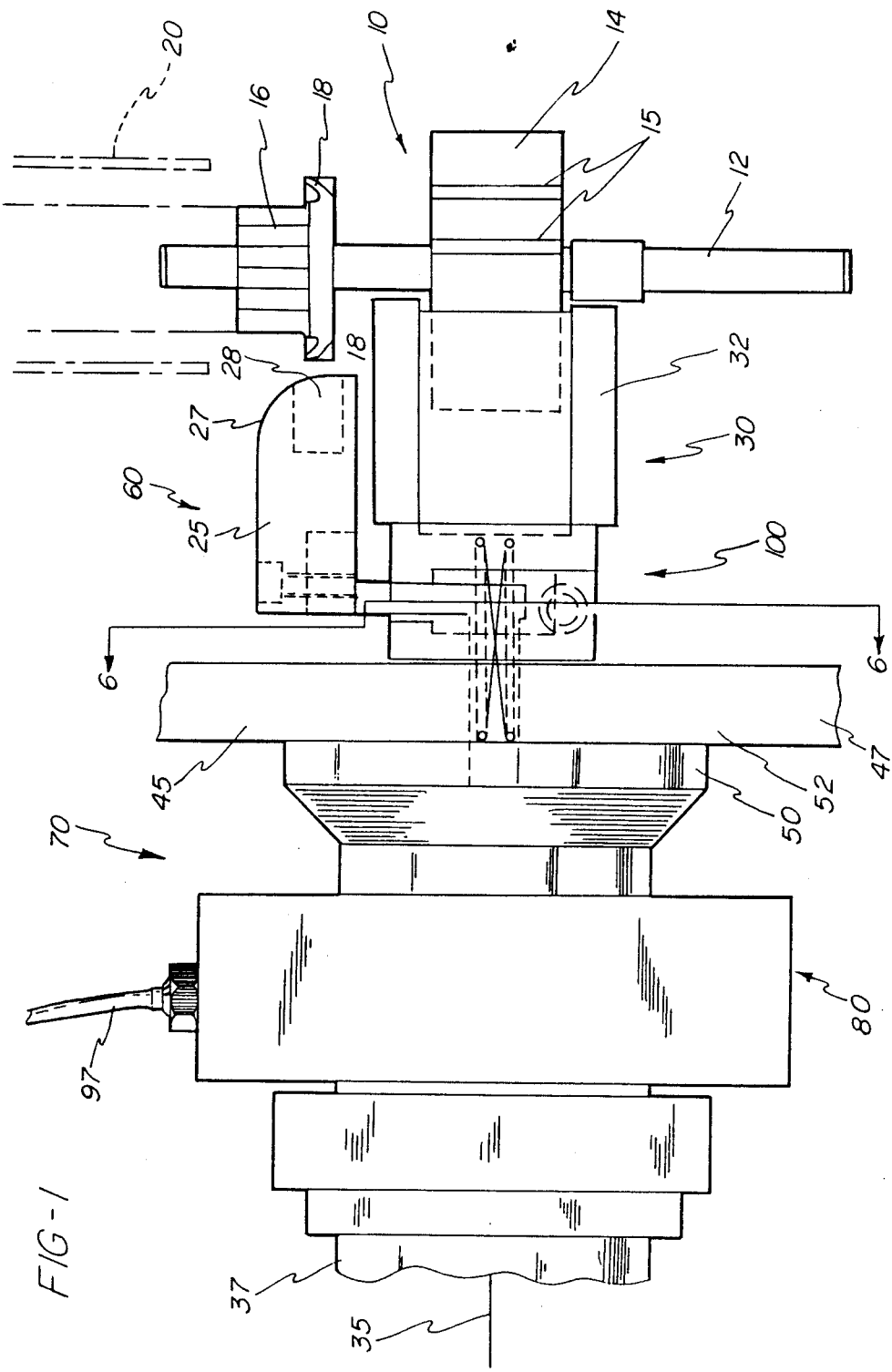
FIG. 1 is a plan view of a portion of an armature winding machine showing the basic components comprising the lead guide actuating mechanism of this invention.

Referring now to the drawings which illustrate a preferred embodiment of the invention, a portion of an armature winding machine is shown in FIG. 1. An armature to be wound, shown at 10, includes a shaft 12, a body 14 which is formed from laminated plates having slots 15 formed therein for receiving the armature wire, and a commutator 16 provided with tangs 18. A shield 20 is provided to cover the commutator 16, and the tangs 18, to prevent the armature wire from tangling with the tangs 18 during the winding of the armature. The shield 20 is withdrawn to expose the tangs at the completion of the winding of the armature, and then a lead guide 25 is installed over one of the tangs 18 to direct the wire into place around that tang. The lead guide 25 includes a nose tip 27 having a recess 28 into which the selected tang 18 can be placed when the lead guide 25 is moved from its first position, as shown clear of the tangs, to its second position.

A non-rotating wire guide assembly 30, which includes wire guide forms 32, is provided to direct the wire into the slots 15 in the body 14 of the armature 10.

Figure 3:
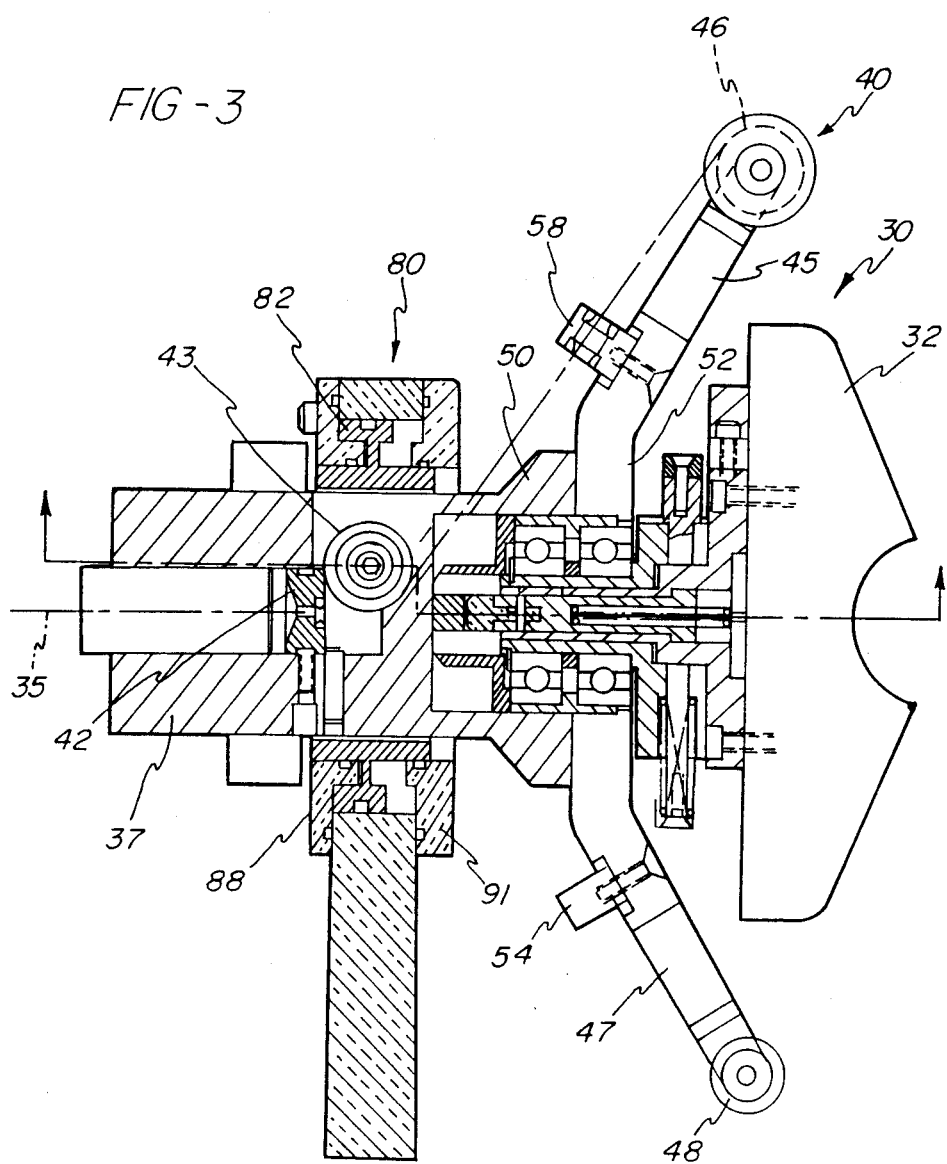
FIG. 3 is a cross sectional elevational view, similar to FIG. 2.

Wire 35 is fed axially into the end of the armature winding machine (from the left, as viewed in FIGS. 1 and 3) through a motor (not shown) and the motor shaft 37 to a flyer 40, shown in FIG. 3, where it is then directed across the wire guide forms 32 into the armature slots 15. A bushing 42 and an idler 43 (FIGS. 3 and 4) may be provided where necessary to facilitate the movement of the wire 35 within the shaft 37.

The flyer 40 includes a flyer arm 45, which includes pulley 46 at the end thereof, and a second arm 47 with a counterweight 48 so that the flyer may be rotated at high speed without causing undue vibration. The end of the motor shaft 37 includes a flange 50.

The two radially extending arms 45 and 47 of the flyer 40 are integrally formed with a cylindrical center section 52, which is attached to the flange 50 preferably by machine screws (not shown), thus leaving the center portion 55 open. Into this opening is placed a bearing assembly 57 which supports the wire guide assembly 30 and also the lead guide 25 and its actuating mechanism, as will be explained. A bushing 58 and counterweight 59 may also be provided to facilitate the movement of the wire, if desired.

Thus, the motor drive shaft 37 and flange 50, along with the flyer 40 comprise a rotating member for moving the wire 35 around the armature 10 and for directing the wire into the slots 15.

After the armature 10 has been fully wound, it is desirable and necessary to attach the wire to a selected tang 18, and for this purpose, the lead guide 25 is provided. It is moved into position over the tang by a lead guide actuating mechanism 60. This mechanism includes a rotating component, and first and second non-rotating components.

Figure 2:
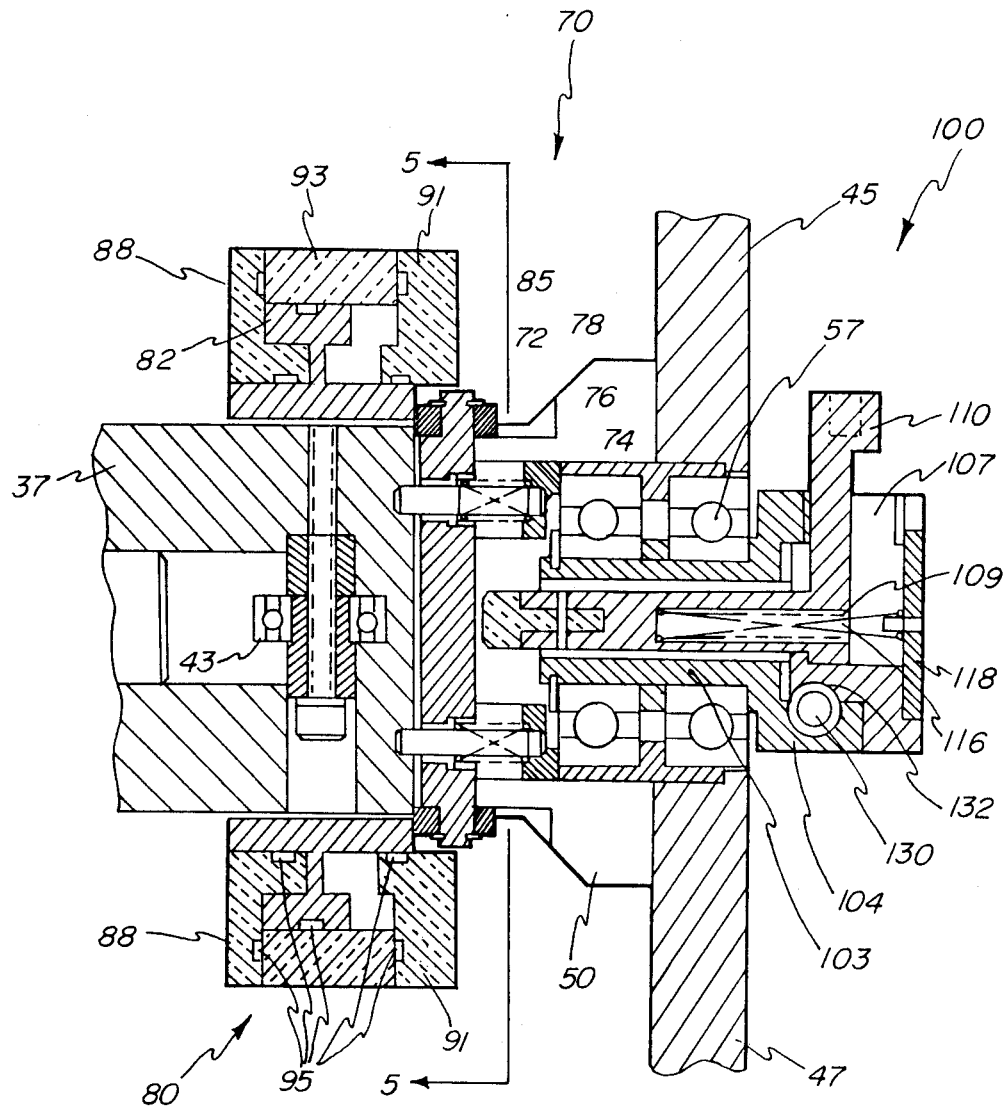
FIG. 2 is a cross sectional plan view showing in more detail the components comprising the present invention.
Figure 5:
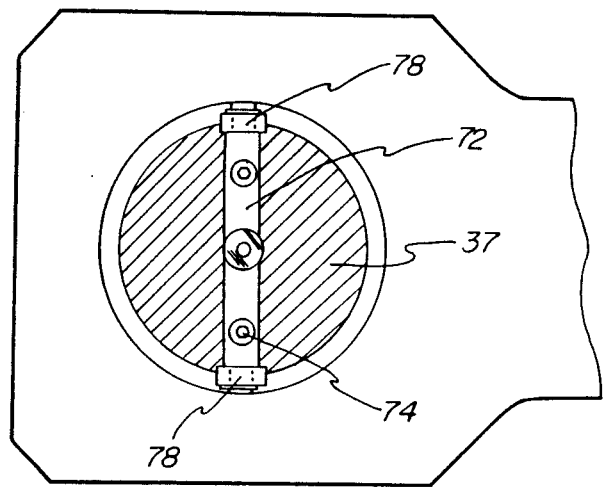
FIG. 5 is a view of the diametrical arm and rollers, and the actuating cylinder, taken along line 5—5 in FIG. 2.

The rotating component 70 (best shown in FIGS. 2 and 5) is made a part of the motor drive shaft 37 and is installed within the opening 55 found in flange 50. The rotating component 70 includes a diametrically extending arm 72 which is supported for rotation on the shaft 37 by means of two pins 74 having springs 76 placed between retainers 77 and the arm 72 thereby to bias the arm 72 to the left, as shown in FIG. 2 while permitting limited movement of the arm 72 axially to the right. Rollers 78 are journaled at the ends of the arm 72.

Figure 4:
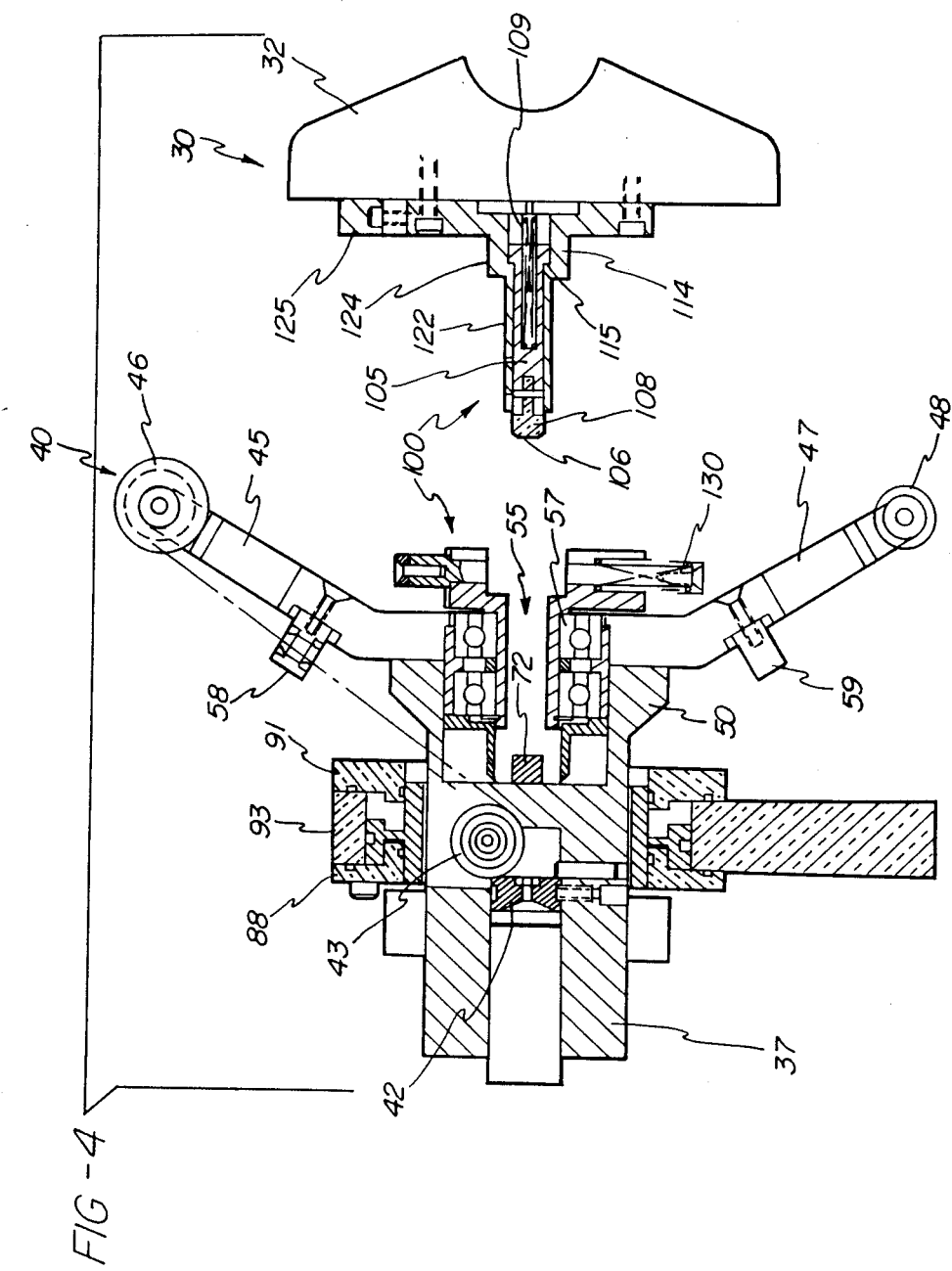
FIG. 4 is an exploded view, also in cross section, showing the wire guide form and lead guide pin assembly separated from the flyer, flyer drive shaft, and lead guide actuating piston.

The first non-rotating component 80 of the lead guide actuating mechanism 60 includes a piston 82 which completely encircles the motor drive shaft 37 and is obviously coaxial therewith. As shown in FIGS. 2-4, the piston 82 includes an annular surface 85 which is exposed for contact with the rollers 78 on the rotating component 70. The piston 82 may move axially, relative to the axis of rotation of the motor shaft 37.

A portion of the piston 82 is mounted within a plenum 87 formed in an actuator cylinder 88. The cylinder 88 includes first and second cylinder plates 89 and 91 and end plates 93, all of which are secured together with appropriate seals 95. A source of air pressure is supplied to one side of the plenum 87 by means of an air hose 97 (FIG. 1) to move the piston 82 axially in a first direction, or to the right as shown in FIG. 2. It is to be understood that the piston 82 does not itself rotate.

The second non-rotating component 100 of the lead guide actuating mechanism 60 includes a non-rotating, hollow member 102 which is supported in the flange 50 by means of the bearings 57. The member 102 includes a cylindrical portion 103 and a rectangular portion 104.

An axially aligned pin 105 extends through a cutout 107 in the member 102. It has a bearing surface 106 at the end thereof which is spaced apart from the center of the arm 72 during normal operation, that is, when the arm 72 is in its rest position.

When the arm 72 is in the rest position, the rollers 78 are also spaced apart from the annular surface 85 of the piston 82, and therefore there is no contact therewith, and consequently no wear.

The bearing surface 106 of the axially aligned, pin 105 is preferably a suitable friction resistant insert 108 which will engage the arm 72 whenever the piston 82 is moved in the first direction to engage the rollers 78 and thereby move the entire arm 72 axially against the force exerted by the springs 76.

The axially aligned pin 105 is L-shaped, as shown in FIG. 2, and is biased in the second axial direction, or to the left, by means, of a spring 109. An outwardly extending arm 110 of pin 105 supports the lead guide 25, and therefore when the pin 105 moves in the first direction, or to the right (in the drawings), the lead guide 25 also moves to the right. This will move the lead guide 25 over a selected one of the tangs 18 of the commutator 16.

As shown in FIG. 4, the axially aligned pin 105 is mounted in a housing 114 which forms a part of the wire guide assembly 30. The pin 105 is prevented from moving to the left beyond the step 115 by the arm 110, and it is biased to the left by means of the spring 109 which extends into an opening 116 formed in the pin 105 and which presses against a cover plate 118 secured to the housing 114 by means of screws, not shown.

Figure 6:
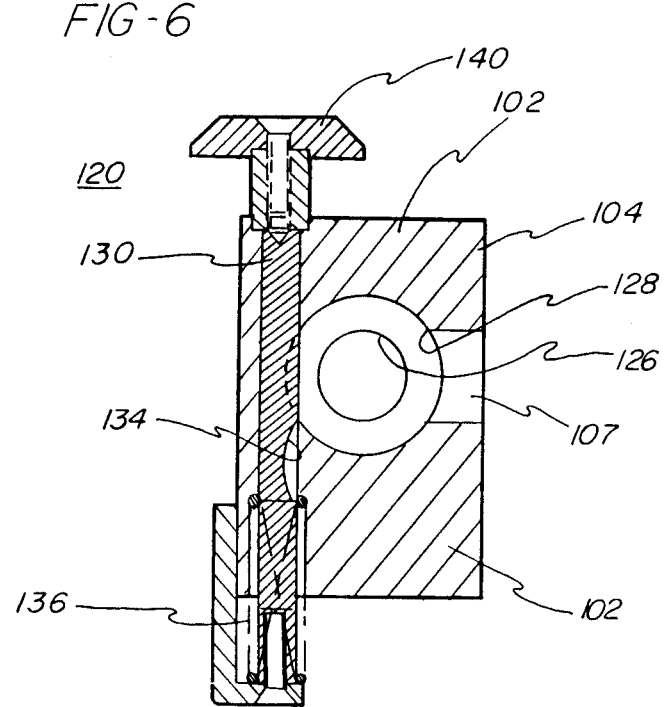
FIG. 6 is a cross sectional view of a quick release mechanism for the wire guide forms, taken along line 6—6 in FIG. 1.

Also, as shown in FIG. 4, the wire guide assembly 30 is easily removable from the non-rotating member 102 by means of the quick release mechanism 120 shown in more detail in FIG. 6.

The housing 114 includes a cylindrical portion having two outside diameters 122 and 124 and an elongated portion 125 onto which the wire guide forms 32 are attached. The cylindrical portions of the housing 114 extend into a corresponding openings having internal diameters 126 and 128 formed in the non-rotating member 102.

A release pin 130 is mounted in the member 102 and normally engages a cutout 132 (FIG. 2) in the housing 114. A cut-away 134 in the release pin 130, which is normally biased away from the cutout 132 by spring 136, will permit removal of the housing 114 from the member 102 when the pin 130 is moved into proper position.

As shown in FIG. 6, the release pin 130 is provided with a handle 140 that the operator may grasp to lift the pin 130 and thus position it properly to release the wire guide assembly.

While the form of apparatus described herein constitutes a preferred embodiment of this invention, it is to be understood that the invention is not limited to this precise form of apparatus, and that changes may be made in either without departing from the scope of the invention, which is defined in the appended claim.

What is claimed is:

1. A lead guide mechanism for use on an armature winding machine of the type that includes a shaft for rotating a flyer which applies wire to slots in an armature, and a non-rotating component carried by the rotating shaft for supporting the wire guide forms which direct the wire into the slots, said mechanism including
    a lead guide,
    means for supporting said lead guide on the non-rotating component for movement from a first position clear on the tangs on the armature being would to a second position whereby said lead guide covers a selected tang, and
    means for actuating said lead guide supporting means thereby to move the lead guide into position relative to the selected tang,
    wherein said actuating means includes a piston surrounding the shaft for rotating the flyer, means for moving said piston axially in a first direction, and means mounted on the flyer drive shaft and responsive to the movement of said piston in said first direction for engaging said lead guide supporting means.

2. The mechanism of claim 1 wherein said lead guide supporting means includes a pin associated with the non-rotating component, at least a portion of said pin being positioned coaxially relative to the flyer drive shaft.

3. The mechanism of claim 1 wherein said piston, said lead guide supporting means, and said engaging means are in non-contacting relation until said piston is moved axially in said first direction, thereby to minimize friction and wear.

4. The mechanism of claim 1 further including means for separating said non-rotating component from the flyer drive shaft thereby to permit quick replacement thereof.

5. A lead guide actuating mechanism for use on an armature winding machine of the type that includes a shaft for rotating a flyer which applies wire to slots in an armature, and a non-rotating component carried by the rotating shaft for supporting the wire guide forms which direct the wire into the slots, said mechanism including
    a lead guide,
    means for supporting said lead guide on the non-rotating component for movement from a first position clear on the tangs on the armature being wound to a second position whereby said lead guide covers s selected tang, and
    means for actuating said lead guide supporting means thereby to move the lead guide into position relative to the selected tang,
    wherein said actuating means includes
    a piston mounted for axial movement relative to said flyer drive shaft, and
    wherein said lead guide supporting means includes
    a diametrically extending arm mounted for rotation with said shaft, said arm being provided with roller means near the ends thereof for engagement with said piston, and
    an axially aligned pin mounted in said non-rotating component, said pin having a first end provided with a bearing surface for engaging said arm when said piston is moved axially in the first direction, said pin being provided with an arm extending radially outwardly through said non-rotating component onto which said lead guide is mounted.

6. A compact lead guide actuating mechanism for use in connection with an armature winding machine, said actuating mechanism comprising a rotating component and first and second non-rotating components,
    said first non-rotating component including
    an annular plenum surrounding the rotating member,
    a piston mounted in said plenum for axial movement relative to the rotating member,
    means for introducing gas under pressure into said plenum to move said piston axially in a first direction, and
    said piston including an annular surface exposed for contact with said rotating component,
    said rotating component including
    a diametrically extending arm having roller means near the ends thereof for engaging said annular surface mounted for rotation with the flyer which applies wire to the armature,
    said second non-rotating component including
    a non-rotating shaft journaled within said rotating component onto which is mounted the wire guide forms,
    an axially aligned pin in said non-rotating shaft having a first end provided with a bearing surface for engaging said arm when said piston is moved axially in the first direction, said pin being provided with an arm extending radially outwardly through said non-rotating shaft for actuating the lead guide mechanism.

* * * * *